Sept. 11, 1956  R. L. DOCKENDORFF  2,762,690
CONTROL OF FOAMING AND LOSS OF ACID IN
CONCENTRATION OF SULFURIC ACID
Filed Jan. 19, 1953
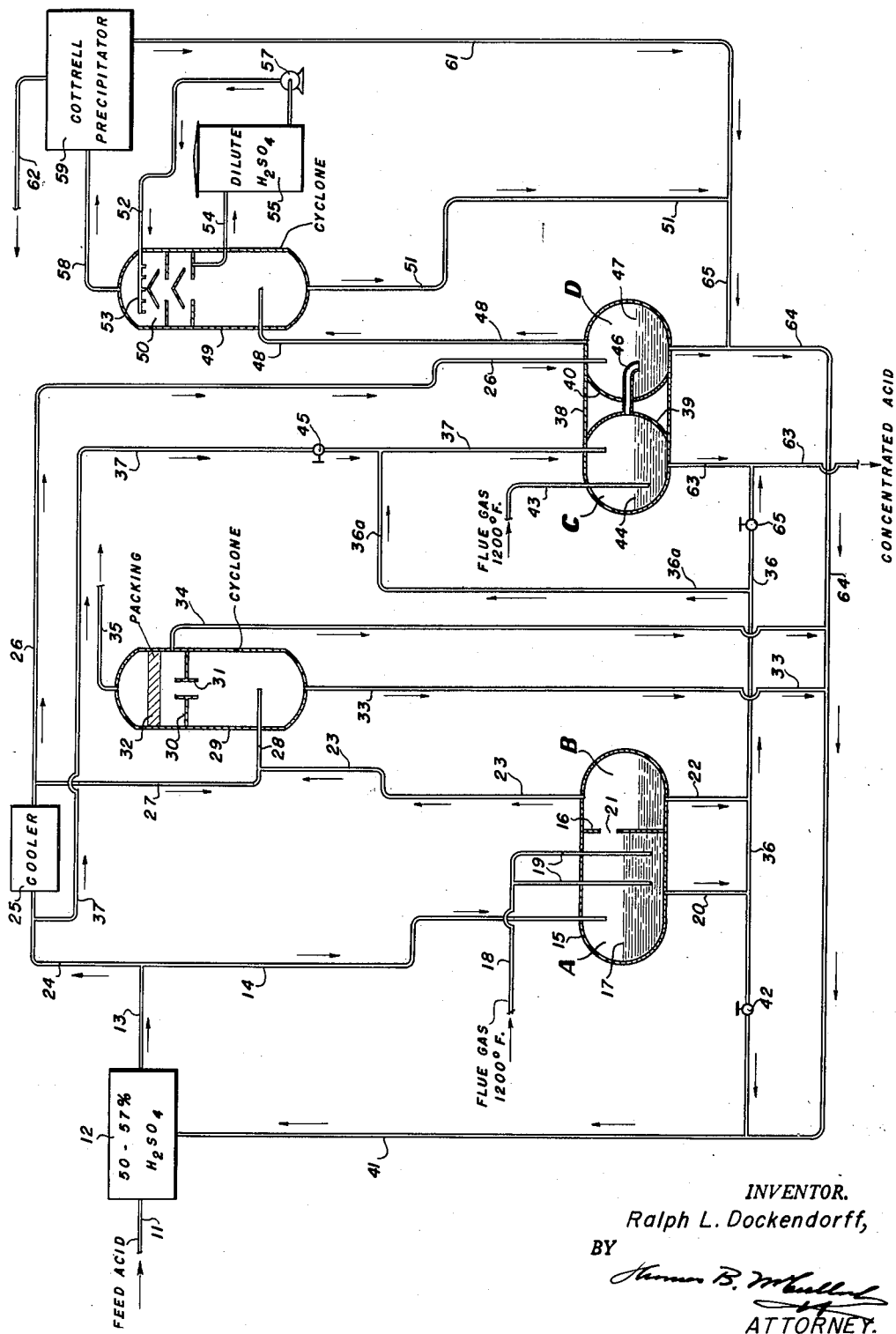
INVENTOR.
Ralph L. Dockendorff,
BY
ATTORNEY.

United States Patent Office 2,762,690
Patented Sept. 11, 1956

2,762,690

CONTROL OF FOAMING AND LOSS OF ACID IN CONCENTRATION OF SULFURIC ACID

Ralph L. Dockendorff, Baytown, Tex., assignor, by mesne assignments, to Esso Research and Engineering Company, Elizabeth, N. J., a corporation of Delaware Application January 19, 1953, Serial No. 332,019

4 Claims. (Cl. 23—173)

The present invention is directed to a method for controlling foaming and loss of acid in the concentration of sulfuric acid. More particularly, the invention is directed to the concentration of sulfuric acid in which a hot flue gas contacts a weak sulfuric acid. In its more particular aspects, the invention is directed to recovering sulfuric acid suspended in a gaseous stream withdrawn from a concentration zone of a sulfuric acid concentration system.

The present invention may be briefly described as a method for controlling foaming and loss of acid in the concentration of sulfuric acid in which a gaseous stream containing a suspension of sulfuric acid is recovered from an acid concentration zone at an elevated temperature. The gaseous stream in accordance with the present invention is contacted with a liquid stream of sulfuric acid having an $H_2SO_4$ concentration lower than a concentration of $H_2SO_4$ in the suspension in the gaseous stream. The liquid stream of sulfuric acid is at a temperature substantially less than the temperature of the gaseous stream such that the contacting or intermingling to form an admixture results in a substantial cooling of the stream having the greater temperature so that the lead lining of equipment in the system is protected. The admixture is then separated into a liquid acid phase and gaseous phase. The liquid acid phase may be recycled and concentrated further and the gaseous phase may be washed as desired with dilute sulfuric acid to recover further amounts of acid.

The gaseous phase may then be subjected to a burning operation to prevent formation of fumes.

The acid supplied as a feed stock to the present invention will ordinarily have a concentration of $H_2SO_4$ in the range from about 50% to about 60% but ordinarily will range from 50% to 57% and usually the feed acid will have a concentration of 57% $H_2SO_4$. This acid may be the spent acid recovered from petroleum refining operations in which petroleum fractions are treated with sulfuric acid to refine the fraction. For example, the spent acid may result from the acid treating of gasoline, kerosene, heating oil and lubricating oil fractions. The acid may be a mixture of acid recovered from such operations. Usually the acid is recovered in the form of an acid sludge from acid treatment of petroleum fractions and the acid sludge is hydrolyzed with water and/or steam to form a weak acid which serves as a feed stock to the process of the present invention.

By virtue of the treating operation the acid may contain a substantial amount of organic bodies. Although a major quantity of the organic bodies is separated in the hydrolysis operation the weak acid fed to the process still contains organic bodies including carbonaceous material which remains suspended in the acid. These organic bodies and carbonaceous material are difficult to handle in that they contribute to foaming difficulties in the concentration system. Thus the foam bubbles appear to be stabilized and strengthened by carbon particles and extraneous liquid hydrocarbons which may be carried along with the hot gaseous stream which is used to concentrate the acid.

Acid is also lost from the gaseous streams discharged from an acid concentration system by mechanical entrainment or suspension of acid droplets as a mist in the hot gas.

In accordance with the present invention, the foaming difficulties and loss of acid are alleviated or entirely reduced by contacting the gaseous stream with a liquid stream of sulfuric acid having a lower concentration of sulfuric acid than the concentration of acid carried as a suspension such as a foam or mist in the gaseous stream. The liquid stream is also at a lower temperature than the gaseous stream and serves to cool the latter and protect the equipment.

The sulfuric acid carried in suspension in the gaseous stream will have a concentration in the range from about 60% to about 85% of $H_2SO_4$. The liquid stream may have a concentration of $H_2SO_4$ in the range from about 50% to about 60%.

In one stage of the concentration system the sulfuric acid entrained and carried in suspension as a foam may have a concentration in the range from 68% to 75% $H_2SO_4$ while in a second stage of the process the sulfuric acid entrained as a mist may have a concentration in the range from 80% to 85% $H_2SO_4$.

The temperature of the gaseous stream may range from about 240° to about 300° F. and usually will be about 220° F. The temperature of the gaseous stream may be reduced to as much as 210° F.

The temperature of the liquid stream ordinarily is a temperature in the range from 140° to 160° F. Good results may be obtained at about 150° F.

The gaseous stream may be contacted with the liquid stream by introducing the liquid stream in cocurrent flow into the gaseous stream. However, the liquid stream may be introduced countercurrently into the gaseous stream to achieve the contact. When the suspension is in the form of a foam it may be desirable to introduce the liquid stream co-currently into the gaseous stream to achieve best results and to obtain a kinetic effect on admixture of the two streams. When the sulfuric acid is carried in the gaseous stream as a mist good results may be achieved by introducing the liquid stream countercurrently into the gaseous stream.

After the admixture of the liquid stream and the gaseous stream the admixture is routed into a separation zone which preferably is of a cyclone type. Thus the admixture is introduced tangentially into the separation zone which causes a swirling or circular motion which tends to achieve a higher gravitational effect than is ordinarily achieved in a separation zone which causes collapsing of the foam bubbles and coalescing of the mist particles.

It is desirable that the suspension be contacted in the cyclone separation stage with a contacting means such as a packed section or a disc or doughnut-type of packing material to achieve ultimate separation of acid from the hot gases. It is within the purview of my invention to wash the packed section if desired with a weak or dilute acid to recover further quantities of acid which may be suspended in the gases.

The invention will be further described by reference to the drawing in which the single figure is a flow diagram of a preferred mode of practicing the invention.

Referring now to the drawing numeral 11 designates a feed acid which is introduced from a source of weak acid, such as from a petroleum refining operation. This acid may suitably be of a strength in the range from 50% to 60% $H_2SO_4$ but ordinarily is in the range from 50% to 57% $H_2SO_4$. This acid may be introduced suitably at a temperature of about 170° F. and discharged into a settling tank 12 which may be operated at a temperature in the range from 200° to 250° F. Suitable steam coils, not shown, may be provided in settling tank 12 and also provision may be made for withdrawing from tank 12 any sludgy bodies which may separate from the acid. In any event the acid, say at a strength of 57% and at a temperature of 216° F., is withdrawn from tank 12 by line 13 and discharged by line 14 into a concentration zone 15 which is provided with a baffle plate 16 which separates the vessel 15 into zones A and B. In zone A there is introduced below the surface 17 of the acid contained therein by way of line 18 and manifold 19, hot flue gas at a temperature of about 1200° F. which serves to concentrate the acid by removing water therefrom. The acid below surface 17 in zone A is at a temperature in the range from about 250° to about 290° F. This acid may be withdrawn by way of line 20 and disposed of as will be described further. The acid carried along in the hot gas flows through an opening 21 in baffle member 16 into zone B and acid is withdrawn from zone B by line 22 as will be described further. The hot gases from zone B are discharged therefrom by line 23. This gaseous stream contains a considerable amount of foam which results from the tendency of the acid to foam as has been explained before. To correct this foaming situation, a portion of the acid in line 13 is passed by line 24 through a cooler 25 wherein its temperature is reduced to a temperature of about 150° F. This acid at the reduced temperature is then discharged from cooler 25 by line 26 and a portion of the cooled acid in line 26 is withdrawn from line 27 and introduced co-currently into line 23 to form an admixture with the suspension of acid in the gaseous stream in line 23. The admixture is then introduced by line 28 tangentially into a cyclone separation zone 29 which imparts a swirling motion and allows collapsing of the foam bubbles. Zone 29 is provided with a baffle 30 and a downcomer 31 and also with a packed section 32 in an upper level thereof. The packed section 32 may suitably be carbon Raschig rings.

By virtue of the tangential introduction of the admixture into zone 29 and by virtue of the packing 32 the foam is collapsed and there may be recovered from zone 29 by lines 33 and 34 substantially all the acid carried over into zone 29 from zone B of vessel 15. Line 34 withdraws acid from above the baffle 30 while line 33 withdraws acid from the lower end of vessel 29. The acid recovered by the packing 32 is withdrawn by line 34.

The gases substantially denuded of their acid content are withdrawn from zone 29 by line 35 and may suitably be routed to a fume burning system, such as described by James L. Walker in U. S. Patent 2,522,475, for further disposition.

The acid in lines 20 and 22 is discharged into line 36 and thence into line 36a which carries the main portion of the acid to line 37 and thence into a second concentration vessel 38 which is divided into zones C and D by partition members 39 and 40.

The other portion of the acid in line 36 may suitably be routed into line 41 by opening valve 42 in line 36 for return to the acid settling tank 12 and for recycling in the process.

In concentration vessel 38 provision is made to introduce therein flue gas at a temperature of 1200° F. through line 43. This flue gas is introduced below the level 44 of acid in zone C and causes the acid to become concentrated. The temperature in zone C is in the range from about 350° to about 380° F. This temperature is controlled by introducing by line 37 from line 24 a portion of the feed acid from tank 12; thus the acid flows from tank 12 through line 13 into line 24 and thence through by-pass line 37 controlled by valve 45 into zone C as has been described. From zone C the hot flue gas carries a portion of the acid by way of conduit 46 into zone D which contains a level of acid indicated by numeral 47. From the level 47 the gases escape upwardly and are carried out from zone D by line 48. However, these hot gases carry a suspension or mist of sulfuric acid and it is desirable to recover this acid. Accordingly, in the practice of this invention the cooled acid in line 26 is introduced into zone D countercurrently to the ascending stream of hot gas containing acid mist and the admixture is then discharged by line 48 tangentially into cyclone separation zone 49 which may be of similar type to cyclone 29 but preferably is provided with a packed section including discs and doughnuts 50. As a result of the swirling or tangential motion in zone 49 acid is recovered therefrom by line 51 which withdraws the acid from the lower end of zone 49. Any acid mist which is not separated passes upwardly through the packed section 50 and is washed with water or a dilute acid introduced by line 52 through sprays or spider 53. The dilute acid is withdrawn from the lower end of the packed section by line 54 into a dilute sulfuric acid tank 55 and recirculated through line 56 and pump 57 to the packed section 50 as has been described. From time to time the dilute acid in tank 55 may be withdrawn, introduced into tank 12 with the acid introduced either by line 11 or line 41, and further concentrated as has been described. The dilute acid or water in tank 55 may have an $H_2SO_4$ content in the range from 0 to 50%. Good results are obtained with dilute acid of 30% $H_2SO_4$.

The gases from zone 49 are discharged therefrom by line 58 into a Cottrell precipitator 59. The acid recovered in precipitator 59 is withdrawn therefrom by line 61. The gases from precipitator 59 are discharged by line 62 into a fume burning system which is disclosed in the patent to Walker supra.

The concentrated acid from zone C is a desirable product and this acid may be withdrawn from the system by line 63 for further use in refining petroleum or as may be desired. Acid is withdrawn from zone D by line 64 and is admixed with acid from lines 51 and 61 which is introduced into line 64 by line 65. The acid in line 64 is then discharged into line 41 and returned to tank 12.

It may be desirable under some conditions to admix with the acid product in line 63 a portion of the acid in line 36. Provision is, therefore, made for line 36 to connect to line 63 by opening valve 65 therein.

It will be seen from the foregoing description taken with the drawing that I provide a system for controlling foaming and recovering acid from hot gases leaving a sulfuric acid concentration system. I accomplish this desirable end by admixing the hot gas carrying a suspension of acid with a liquid acid of a lower strength than the hot acid and at a lower temperature than that of the hot gas. This gives two results: it recovers the acid and it protects the equipment downstream from the concentration zones from the high temperatures, thus allowing the use of lead liners and less expensive equipment than otherwise required. My invention has numerous advantages which include operation with acid strengths which ordinarily would result in severe foaming. In two-stage operations, such as has been described, it is ordinarily necessary to operate interstage with acid strengths in the range from 68% to 74% since outside and in this range severe foaming is encountered. The foaming is less severe within the range, however. In accordance with the present invention it is possible to operate outside of the range and yet avoid the deleterious effects of severe foaming. In short, my operation allows increased flexibility of operations and gives longer on-stream times than ordinarily is possible. The invention also allows substantial recovery of sulfuric acid and prevents substantial pollution of the atmosphere from acid fumes.

The nature and objects of the present invention having been completely described and illustrated, what I wish to claim as new and useful and to secure by Letters Patent is:

1. A method of recovering acid in the concentration of spent dilute sulfuric acid from a petroleum refinery operation which comprises the steps of separately introducing hot flue gases at an elevated temperature of about 1200° F. into first and second pools of dilute sulfuric acid below the surface of said pools to concentrate said dilute sulfuric acid by removing water therefrom and to form first and second gaseous streams containing a suspension of acid including organic bodies and carbonaceous material and first and second at least partially concentrated acid streams, said first pool being at a temperature in the range from about 250° to about 290° F. and being formed from said spent sulfuric acid and said second pool being at a temperature in the range from about 350° to about 380° F. and being formed from said first partially concentrated acid stream, separately recovering said gaseous streams, separately contacting the gaseous streams with a liquid stream of said spent dilute sulfuric acid having an $H_2SO_4$ concentration in the range between about 50% and about 60%, the concentration of $H_2SO_4$ in the suspension in the gaseous streams being in the range between about 60% and about 85%, said liquid streams being at a temperature of about 140° to about 160° F. and the temperature of the gaseous streams being about 240° to about 300° F., to form first and second cooled admixtures, separately introducing the admixtures tangentially into first and second cyclone separation zones, separating the admixtures in said separation zones into first and second liquid acid phases and first and second gaseous phases, and recovering the first and second liquid acid phases.

2. A method in accordance with claim 1 in which the liquid stream is introduced co-currently into the first gaseous stream.

3. A method in accordance with claim 1 in which the liquid stream is introduced countercurrently into the second gaseous stream.

4. A method in accordance with claim 1 in which the liquid acid stream has a concentration of about 57% $H_2SO_4$.

References Cited in the file of this patent

UNITED STATES PATENTS

| | | |
|---|---|---|
| Re. 19,064 | Mast | Jan. 23, 1934 |
| 1,896,287 | Clark | Feb. 7, 1933 |
| 1,991,745 | Hechenbleikner | Feb. 19, 1935 |
| 2,006,031 | Rothammel | June 25, 1935 |
| 2,124,729 | Castner et al. | July 26, 1938 |
| 2,311,625 | Bransky et al. | Feb. 23, 1943 |
| 2,348,328 | Chapman | May 9, 1944 |
| 2,471,072 | Merriam | May 24, 1949 |
| 2,520,454 | Carter | Aug. 29, 1950 |
| 2,604,185 | Johnstone et al. | July 22, 1952 |